United States Patent
Beaty et al.

(10) Patent No.: US 8,949,172 B2
(45) Date of Patent: Feb. 3, 2015

(54) SYSTEM AND METHOD FOR EFFICIENT ALLOCATION OF RESOURCES IN VIRTUALIZED DESKTOP ENVIRONMENTS

(75) Inventors: Kirk A. Beaty, Hawthorne, NY (US); Rajdeep Bhowmik, Johnson City, NY (US); Andrzej Kochut, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 13/491,226

(22) Filed: Jun. 7, 2012

(65) Prior Publication Data

US 2012/0246107 A1    Sep. 27, 2012

Related U.S. Application Data

(63) Continuation of application No. 12/547,726, filed on Aug. 26, 2009, now Pat. No. 8,234,236.

(60) Provisional application No. 61/182,919, filed on Jun. 1, 2009.

(51) Int. Cl.
| | |
|---|---|
| *G06N 5/00* | (2006.01) |
| *G06F 11/34* | (2006.01) |
| *G06F 9/50* | (2006.01) |
| *G06F 11/30* | (2006.01) |
| *H02J 3/14* | (2006.01) |

(52) U.S. Cl.
CPC ............. *G06F 11/3452* (2013.01); *G06N 5/00* (2013.01); *H02J 3/14* (2013.01); *G06F 9/5077* (2013.01); *G06F 9/5088* (2013.01); *G06F 11/301* (2013.01); *G06F 11/3093* (2013.01); *G06F 11/3414* (2013.01); *G06F 11/3423* (2013.01); *G06F 2201/81* (2013.01); *G06F 2201/86* (2013.01)
USPC ................................................ 706/52; 706/45

(58) Field of Classification Search
None
See application file for complete search history.

(56) References Cited

PUBLICATIONS

Neeracher, Scheduling for Heterogeneous Opportunistic Workstation Clusters, Diss. ETH No. 12906, Doctoral Thesis, Swiss Federal Institute of Technology, Zurich, 1998, pp. 1-167.*
Rhee, J., et al. Deskbench: Flexible Virtual Desktop Benchmarking Toolkit. Mini-conference. The 11th IFIP/IEEE International Symposium on Integrated Network Management (IM 2009), Jun. 2009, pp. 1-8.

* cited by examiner

*Primary Examiner* — Wilbert L Starks
(74) *Attorney, Agent, or Firm* — Tutunjian & Bitetto, P.C.; Louis J. Percello

(57) ABSTRACT

A system and method for managing responsiveness of virtual desktops using passive monitoring includes measuring a time between an interactive desktop event and a result of the interactive desktop event. Based on the time, system resources are reallocated to improve the responsiveness.

20 Claims, 4 Drawing Sheets

SYSTEM AND METHOD FOR EFFICIENT ALLOCATION OF RESOURCES IN VIRTUALIZED DESKTOP ENVIRONMENTS

RELATED APPLICATION INFORMATION

This application is a Continuation application of co-pending U.S. patent application Ser. No. 12/547,726 filed on Aug. 26, 2009, which claims priority to provisional application Ser. No. 61/182,919 filed on Jun. 1, 2009, both incorporated herein by reference in their entirety.

BACKGROUND

1. Technical Field

The present invention relates to computer responsiveness to human interactions and more particularly to systems and methods for monitoring and efficiently handling interactive events.

2. Description of the Related Art

Desktop virtualization is a new computing approach to application delivery and management. Desktop virtualization is accompanied by many management challenges for centralized systems—with performance and quality of service management being one of the most important.

Desktop virtualization is a new approach to application delivery and management focused on providing a flexible desktop service. Typically, a virtualized desktop system consists of a set of servers running virtualization software, end-user devices called "thin-clients", and networking fabric providing connectivity between end-user devices and data center(s). Back-end servers can either use operating system virtualization or shared services.

Though centralized desktops provide flexibility, consolidation, and reduction in management costs, they introduce new research challenges not present in the traditional desktop model. Most prominent are security and resource contention issues that arise due to the presence of multiple user sessions on a single physical system.

SUMMARY

A system and method for managing responsiveness of virtual desktops using passive monitoring includes monitoring interactive desktop events for a computer device and measuring a time between the interactive desktop event and a result of the interactive desktop event. Based on the time, desktop responsiveness is evaluated. System resources are reallocated to improve the responsiveness.

A method for managing responsiveness of virtual desktops using passive monitoring includes monitoring keyboard events, mouse events and screen buffer update activities on a user device to determine active and idle periods of a computer device, and measuring a time between the interactive desktop event and a result of the interactive desktop event and employing the time to determine a probability that a virtual component will remain active or idle. Based on the probability, workload is migrated in accordance with the probability that resources will remain active or idle to improve responsiveness.

A system for managing responsiveness of virtual desktops includes a control system configured to receive responsiveness feedback and to reallocate system resources in accordance with the feedback, the control system being implemented in a computer device with memory storage. The control system includes an activity/idleness profiler configured to receive information about interactive desktop events from a virtual desktop, and an allocation controller configured to receive responsiveness measurements based upon the information about interactive desktop events and to receive resource utilization measurements to determine how to allocate resources to improve responsiveness in the system. An executor is configured to allocate the resources as determined by the allocation controller.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
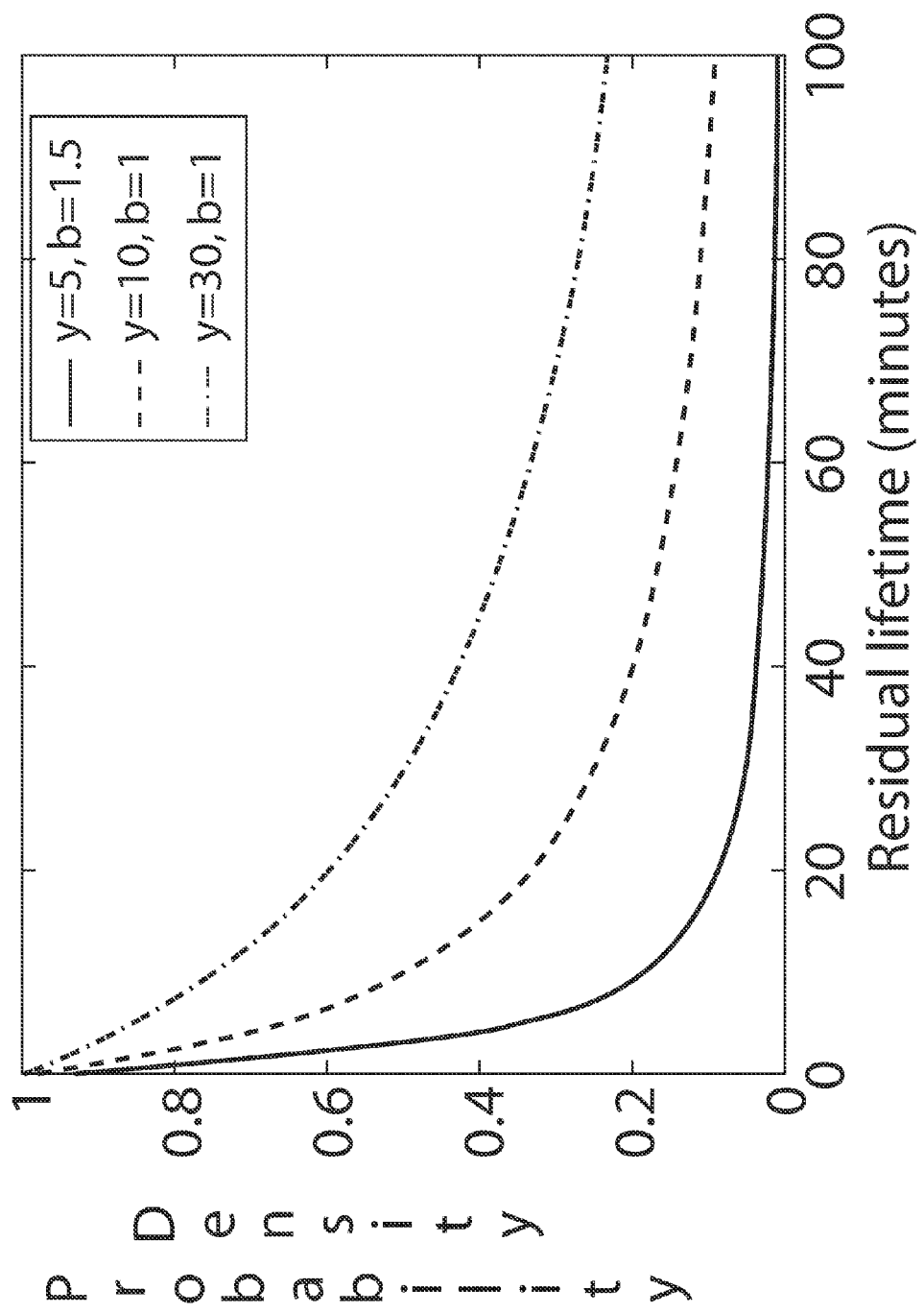
FIG. 1 is a plot of probability density versus residual lifetime for different values of y and b in accordance with an illustration of the present principles.

In accordance with the present principles, a management system and method suitable for efficient resource allocation in virtualized desktop environments is provided. The system and method provide a novel, non-intrusive method for application and remoting protocol diagnostic desktop responsiveness monitoring. In one embodiment, the management system and method are based on studies of desktop workload usage which enable the discovery and leveraging of workload patterns that can lead to increased efficiency—both in terms of desktop responsiveness and resource usage.

Performance aspects of the desktop virtualization paradigm are described herein. One aim of the present disclosure is to develop an online management method suitable for efficient management of virtual machines running desktop workloads. To achieve this, a quality of service metric is defined that can be used to quantify the performance experienced by end users, which closely relates to responsiveness of the system. Since users experience the quality of service through the remote desktop client, managing a satisfactory responsiveness is a factor in the resource management system. A mechanism is provided for passive monitoring of desktop user activities and measuring virtual desktop responsiveness independent of protocol and application characteristics. To accomplish this, keyboard events, mouse events and framebuffer state are employed on the end-user device to measure response time of user actions, such as the time between a double-click on an icon representing an application and the instant when the application window is displayed on the thin-client screen.

Accomplishing this is not easy because remoting protocols loose semantics of the window manager; contrary to systems such as X Server, there is no structured information at the client side. The only available information is limited to the state of the pixel bitmap representing frame buffer. Because of this limitation, a library of measurement elements is created including logical conditions on frame buffer subregions and keyboard and mouse events to re-introduce semantic information at the thin-client device. This permits for precise measurement of virtual desktop responsiveness as close as possible to what the actual user perceives. The measured value includes not only server latency but also delay due to the network transfer of requests and screen updates.

Another aspect of virtual desktop management is the formulation of appropriate strategies for resource reallocation. Virtualization software permits two types of actions: adjustment of shares between virtual machines and live migration of running virtual machines (VMs) between physical servers. These actions can be very effective in enforcing quality of service (QoS) policies, but to develop optimal decision strategies for applying them, a good understanding of workload patterns is needed. Modeling desktop workloads is a significantly different problem from modeling of virtual machines running server workloads. Time-series analysis techniques can be applied to develop optimal strategies for performance management of virtual servers. To explore the applicability of such methods to desktop workloads, a set of desktop workload traces have been analyzed which spanned several months of usage. Based on these studies, approaches developed for server virtual machine management are not applicable. One reason is that since workstation workloads are not aggregate; they exhibit frequent bursts, are not smooth, and are unpredictable even on short timescales. However, we have found a functional form that excellently fits the distribution of active and idle periods in workstation traces. This distribution became the basis for providing effective prediction of workload behavior thus allowing the development of better resource allocation strategies.

In summary, the present embodiments provide: desktop responsiveness monitoring methods permitting non-intrusive application and protocol independent sampling of response time of predefined sets of desktop actions; and statistical analysis for collection of desktop usage traces and definitions of functional forms describing distribution of idle and active periods in desktop workloads. The analysis in accordance with the present principles shows that these distributions are not memory-less and thus might be leveraged to provide accurate predictions of future state (i.e., active or idle) of a virtual desktop, based on the length of time this desktop was active (or idle). Online virtual desktop management methods are specifically suited for performance management of virtual machines running desktop workload.

Desktop virtualization leverages operating system (OS) virtualization and remoting protocols to provide users with remote access to virtual machines running in a centralized data center. Desktop virtualization promises significant benefits in terms of improved data security, reduced management complexity, and more efficient and flexible resource usage. We focus on operating system virtualization. This model is very flexible allowing users full control over their desktops including the ability to restart virtual machine(s) or to modify the operating system itself without interrupting other desktop users.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In accordance with the present principles, the present inventors have carried out studies to determine preferred methodologies for carrying out the present principles. These methods and techniques and their related discussion are provided for a better understanding of the present principles and should not be construed as limiting. Other methods may be implemented in accordance with the present principles.

DESKTOP WORKLOAD STUDY: We have performed a study of desktop workload traces geared towards understanding what the best approaches are for managing virtual machines running desktop workloads. Our work on virtual machine management running server workloads indicated that it is important for the management methods to have a good handle on workload predictability. For virtualized servers, a scheme using time-series forecasting methods to evaluate which virtual machines are good candidates and what expected benefits can be derived from a migration decision has been employed. Because desktop workloads are very bursty on short timescales, demand forecasting approaches used successfully for server workloads are not usually effective. However, there are other features specific to desktop workloads that can be leveraged. In particular, people tend to work in phases with activity periods interleaved with idle periods. This is usually related to breaks or other activities (such as meetings or phone conversations). We leverage this fact to improve desktop virtual machine management.

Data Set:

The data set employed for one of our studies contained 17 traces of desktop utilization measurements gathered over a period of 5 months. Each measurement represents an average of 10 seconds. The data gathered covers a majority of statistics available via the "Windows® Management Interface" both at the operating system (OS) and application level, e.g., CPU, memory, disk and network usage. The data was collected using an agent installed on the Windows® workstation that gathered the aforementioned statistics every 10 seconds and periodically uploaded them to the central server.

The accumulated data analyzed had a total of nearly 10 million of these 10-second samples. The collected data represent a significant source of knowledge about the desktop workload properties. We chose the 10 second averaging interval to gain better insight into the short bursts of demand of desktops. This is of note since even a relatively short period of system overload is noticeable by the desktop user.

Idleness Detection:

There are several ways of detecting activity and idleness in workstations. One option is to set an idleness threshold for CPU usage and mark all intervals when the usage is below this threshold as idle with the remaining intervals marked as active. Another option, especially attractive for virtual desktop systems, is to monitor keyboard and mouse events as well as screen buffer update activities on the remote user device. This approach permits for precise recognition of moments when the user is active and also for quantifying the level of activity. Desktop idleness detection was previously studied in the context of using CPU cycles on idle workstations to perform large scale distributed computations. In the following analysis, we use the threshold-based method to detect and study desktop idleness and interactiveness.

Analysis:

To analyze the idleness and activity patterns of desktop CPU demand, we have converted utilization traces into a binary time series with a value of 0 if the CPU utilization during the 10 second measurement interval was lower than 5% and value of 1 otherwise. The threshold of 5% was based on the data observations of idle Windows XP® machines, and also from the fact that changes to this threshold do not change the shape of the idle time probability distributions. Other thresholds may be selected, and other criteria may be employed.

Next, we computed time series of the length of idle and active periods by counting the subsequent numbers of idle or active samples. This becomes the basis for our statistical analysis. We have performed a distribution fit analysis using a Matlab® implementation of the known Nelder-Mead algorithm to determine a functional form that best fits empirical data collected. Both active and idle time distributions are not memory-less (i.e., non-exponential). In fact, the probability of a workstation remaining idle for a given period of time increases with the time this workstation was already idle. Thus, we have found that the best fit is provided not by exponential distribution but the following functional form:

$$F(x)=1-a*x^{-b} \quad (1)$$

where b is the parameter depending on the workstation and a is a normalizing factor which enforces that F(x) is a probability distribution.

An example analysis for one of the traces includes presenting raw time series of CPU usage data (in MHz) on a day, hour or other timescale. The raw time series shows significant burstiness of the demand. A histogram of CPU usage for the same trace may be provided with probability density versus CPU usage (e.g., MHz). The histogram may be of lengths of idle time periods for the same trace (with idle time being the state with CPU usage below 200 MHz) for the same workstation and shows the analytical model represented by the functional form in Equation 1, where the fit is excellent.

Results for the active cycle of the same workstation may also be graphically presented, e.g., to show the fit of analytical functions to histograms of another workstation, representing idle and active periods. The b coefficient differs for idle and active periods of the same workstations. Again, the agreement of the analytical model with the empirical data was highly correlated. Overall, the traces we have tested have a $R^2$ fit coefficient exceeding 0.9, signifying that 90% of variability in empirical data is explained by the functional model. The b parameter varied between 0.7 and 2.

A feature of the workload that we are interested in is how long a given workstation is likely to remain idle or active knowing that it has been idle or active for time y. This is summarized by P(Residual lifetime>x|Age=y). Since the distributions are well matched by the Equation 1 this probability can be evaluated as:

$$P(\text{Residual lifetime} > x | \text{Age} = y) = \left[\frac{y}{x+y}\right]^b \quad (2)$$

Referring now in detail to the figures in which like numerals represent the same or similar elements and initially to FIG. 1, a plot presents example evolutions of residual lifetime probability densities as in Equation (2). The plot presents Equation (2) for several values of y and b. We use this form in our management methods described herein to make virtual machine reallocation decisions. A noteworthy fact is that the same functional form was found to match well with the lifetime distribution of Unix processes. This suggests that the functional form in Equation 1 has intrinsic properties of accurately representing the users' activity and idleness cycles. In summary, our study includes the following observations: 1) Desktop workload is bursty and not usually suitable for making predictions using time-series forecasting methods that are successful in server virtual machine management; 2) Idle and active periods of desktop virtual machines can be accurately characterized using the distribution function of the form $1-a*x^{-b}$ where b is a workstation dependent parameter and a is a normalizing factor. Moreover, the parameter b is different for idle and active cycle distributions; 3) Because of the above functional form, the probability of a workstation remaining idle or active for the next x minutes, given it was idle or active for y minutes can be approximated as $$\left[\frac{y}{x+y}\right]^b.$$

PASSIVE MONITORING OF VIRTUAL DESKTOP PERFORMANCE: An issue in the virtualized desktop environment is monitoring the quality of service as perceived by the virtual desktop user. One aspect of quality of service is responsiveness of the system, i.e., time between when the user sends a request and the moment the resulting screen update is rendered on the screen. For example, a good indicator of the desktop responsiveness is the time between a double-click on an icon and the screen update displaying the application window that was started by this double-click.

Since the state available at an end-user device is limited, and we desire to measure end-to-end response time in virtualized desktop systems, we employ only the keyboard and mouse events and the frame buffer state in this example. The present method achieves passive monitoring of user desktop responsiveness by a measuring time interval between the start and end of user actions. The system stores a library of screen subsections (e.g., stored as raster bitmaps) representing areas indicating a start and an end of a measurable action (such as, e.g., a double-click on an icon and a corresponding screen containing an opened application window with some distinguishing graphical features) together with events and logical conditions describing the needed state. The library and its creation, and the on-line execution during which normal desktop operation is monitored and measured will be described.

The library includes a set of measurement element definitions relevant to business functions of a virtual desktop system. Each measurement element is defined by the following features: 1) a keyboard or mouse event pattern signifying the start of a measurement period; 2) a subsection (or several subsections) of a screen related to the event; 3) a conditional expression relating to a location of the event (for mouse events) and the location of the screen subsections, e.g., a given rectangular bitmap has to appear in the square of size 100 pixels around the coordinates of a double-click event; 4) a subsection (or several subsections) of the screen related to a state signifying the end of the measurement interval; 5) a business value of action representing importance of the action to the system utility, e.g., actions related to working with a customer database might be valued more than the ones related to browsing the Internet.

Table 1 presents two examples of measurement elements in the library. A first row in the table defines an element measuring the time of opening a folder. Start of the measurement interval is a mouse double click event with a rectangular screen region around the location clicked containing a folder symbol (the elements shown in Table 1 are illustrated as S1, S2, and E1, E2, the starting elements S1 and S2 symbolize a first click on a file folder S and a second click on the file folder S; the ending element E1 symbolizes a file folder E in a given state) in a highlighted or un-highlighted state. The end of the measurement interval (E1 in this case) is delimited by a first appearance of a small opened folder symbol (found in the corner of a Windows XP® folder window). It should be noted that the elements S1, E1, etc. may represent actual icons on a screen, the states of which may change visually in appearance when clicked on by a mouse cursor. A second row in Table I presents an example for a Firefox web browser. The starting element is again the double-click event (S1 and S2) and certain bitmaps contained within its coordinates, and the ending condition is the presence of two icons (E1 and E2 in a particular state, e.g., highlighted or unhighlighted) in the frame buffer raster. Each of the elements has an assigned business value (Buss. Value in Table I); in this case Firefox is more important than opening folders.

TABLE I

Example Measurement Elements. Each element is defined by logical conditions of the keyboard and mouse events as well as screen buffer content.

| Action | Start Elements | Ending Elements | Starting Condition | Ending Condition | Buss. Value |
|---|---|---|---|---|---|
| Open Folder | S1 S2 | E1 | Double-click and (S1∥S2) | E1 | 1.3 |

TABLE I-continued

Example Measurement Elements. Each element is defined by logical conditions of the keyboard and mouse events as well as screen buffer content.

| Action | Start Elements | Ending Elements | Starting Condition | Ending Condition | Buss. Value |
|---|---|---|---|---|---|
| Open Firefox | S1 S2 | E1 E2 | Double-click and (S1\|\|S2) | E1 & E2 | 2.0 |

A set of measurement elements as described above are generated and stored in a library. During a normal desktop usage, the system monitors the keyboard and mouse events and checks for start signatures of measurement elements in the library. If one of the elements in the library matches the current state (i.e., combination of event and set of screen sub-regions), the system marks the time and starts monitoring the screen state for updates. When an update arrives that validates the ending condition of the measurement element (i.e., logical condition on existence of certain screen sub-regions within the frame buffer) and the match is found, the system determines that the particular action has completed. At that point the response time is computed. We employ a variant of a Knuth-Morris-Pratt string matching algorithm by searching on arrays representing frame buffer states. The matching can be made "fuzzy" to allow for small differences in color schemes or scaling of the features. An implementation of the bitmap fuzzy string searching method can be used to achieve this objective. Another alternative solution is a Hue, Saturation, Intensity (HSI) color model. We can ignore sniffing at the packet level of the remoting protocol for mouse clicks or keyboard events as it is intractable to associate the latter to specific user actions due to lack of semantic annotations.

Figure 2A:
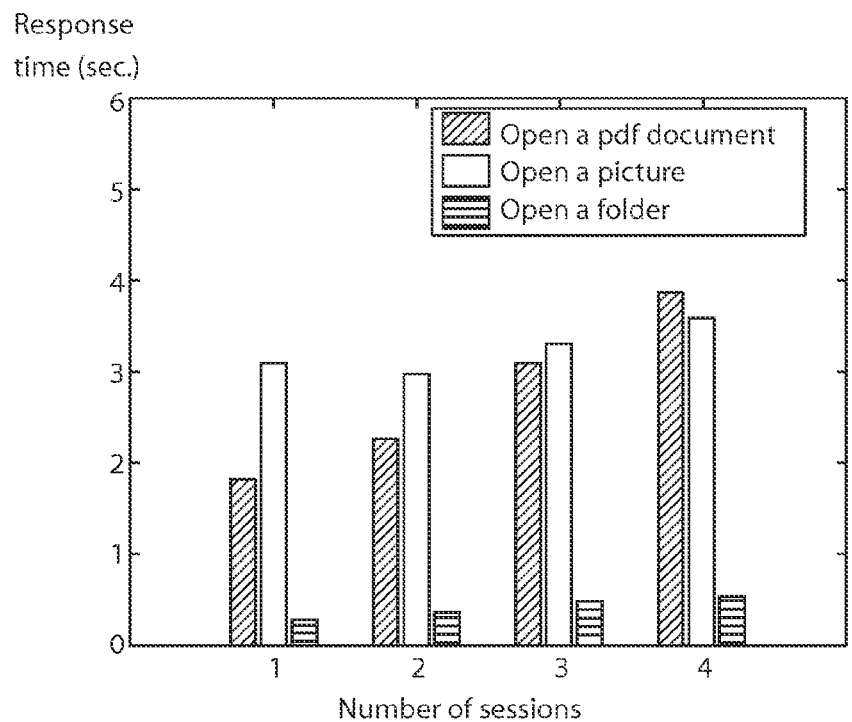
FIG. 2A is a bar chart that presents response time (y-axis) for three different actions as a function of number of concurrent sessions on a single CPU core.
Figure 2B:
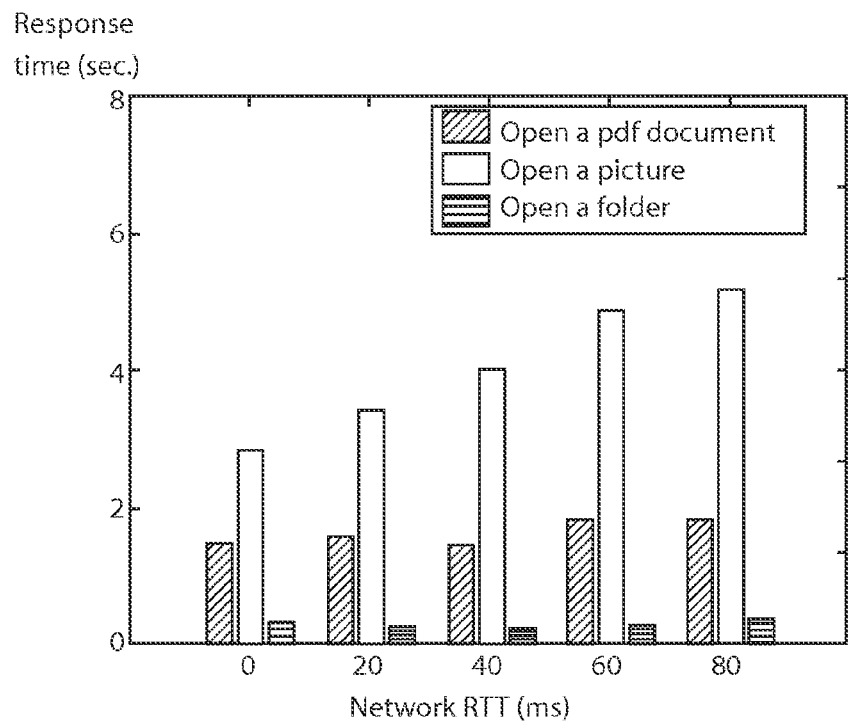
FIG. 2B is a bar chart that presents the same actions as in FIG. 2A, but the x-axis denotes the latency of a network between a thin-client and a data center.

We have performed a group of experiments to validate a passive monitoring approach. FIG. 2A presents response time (y-axis) for three different actions as a function of number of concurrent sessions on single CPU core. The actions include opening a pdf document, opening a picture and opening a folder. FIG. 2A shows that opening Adobe® reader is most sensitive to CPU contention. FIG. 2B presents the same actions, but the x-axis denotes the latency (Network round trip time (RTT)) of a network between a thin-client and a data center (which was simulated using a Linux tc interface). FIG. 2B shows that response time of a rendering picture is most affected by increased latency. Both experiments illustrate generality and applicability of our method.

VIRTUAL DESKTOP MANAGEMENT: Performance management of virtual desktops needs a good understanding of desktop workload properties as well as user experience. An on-line system and method for efficient management of virtual desktop resources is provided in accordance with the present principles that leverages our findings on desktop workload characteristics as well as passive monitoring for desktop responsiveness. The present embodiments attempt to assign shares to desktop virtual machines based on the predicted activeness (or idleness) of the associated user session. The embodiments also shift the load between physical servers if the load difference between them is significant (the actual threshold is a parameter), and this criterion is likely to remain for the length of inter-migration interval. Another feature of the present invention permits for adapting to differing workloads and making migration decisions (costly both in terms of extra resource consumption and time) that are expected to provide a lasting benefit to the system. The decision process is based on probability that a given VM will remain in its current state (either active or idle) within the time horizon of interest. The actual computation of this probability is performed on the functional form from Equation 2 with parameter b fitted to empirical data as described above.

Figure 3:
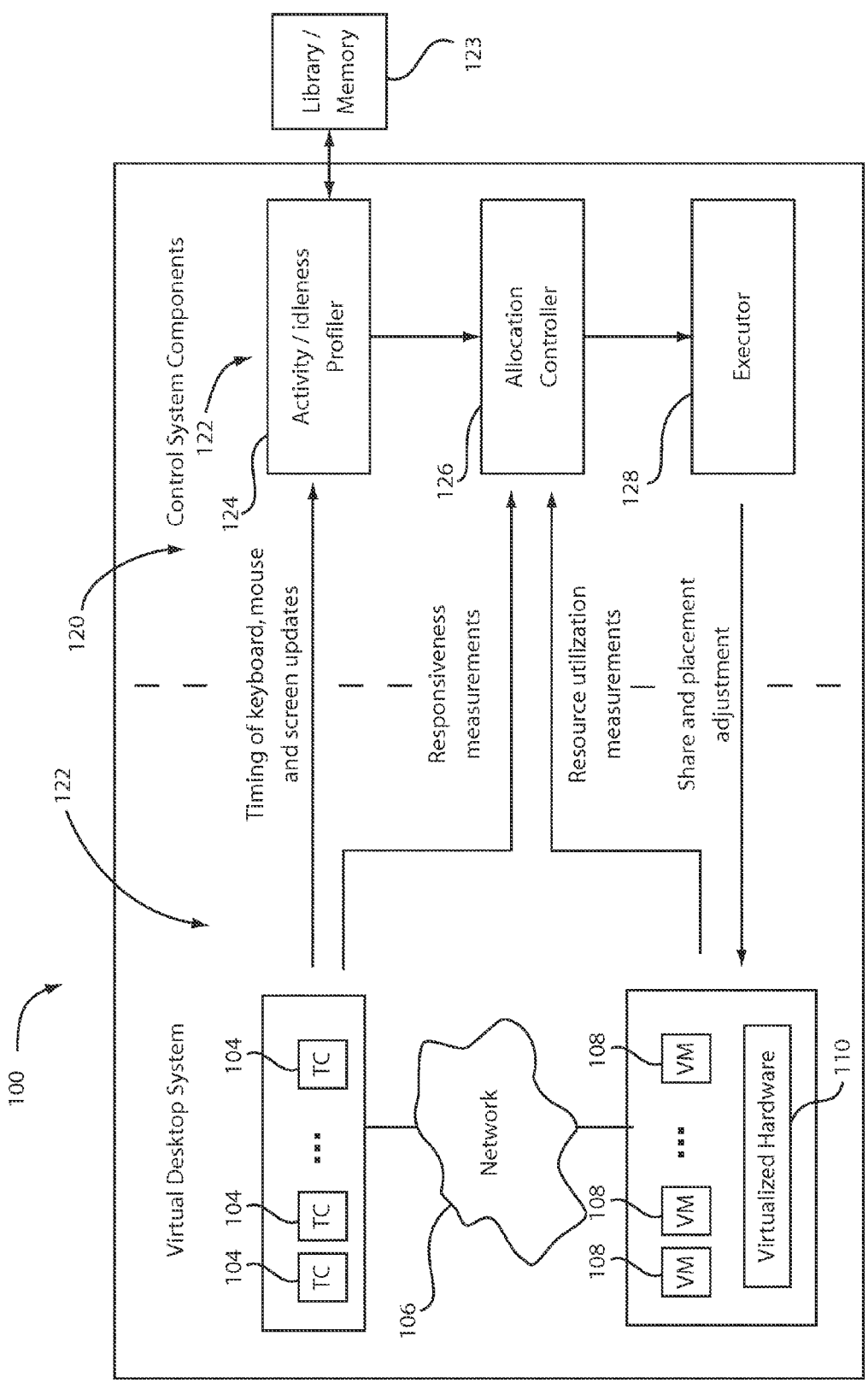
FIG. 3 is a block/flow diagram showing an architecture of a management system in accordance with the present principles.

Referring to FIG. 3, a high-level architecture of a management system 100 in accordance with the present principles is illustratively shown. The diagram is split into two halves. A left half 102 presents a virtual desktop system with thin-clients (TC) 104, networking fabric 106, and virtual machines (VM) 108 running on virtualized servers 110. A right half 120 shows a logical view of three major components of a virtual machine controller 122. Theses components include the following: an activity/idleness profiler 124, an allocation controller 126, and an executor 128. The first component 124 receives information about keyboard, mouse, and screen update activities of each of the thin-clients 104 and models the activity and idleness periods using a statistical approach, e.g., an approach as described above. Utilization cutoff and/or actual keyboard, mouse and screen update activities may be employed as an indication of idleness. Profiler 124 may employ library/memory 123 which stores statistical information, models and other information to assist in profiling activity/idleness.

The allocation controller 126 receives the probabilities of each VM remaining in idle/active state from the activity/idleness profiler 124 as well as responsiveness measurements (from a passive monitoring component, as described) and resource utilization measurements from the virtualization infrastructure. Controller 126 processes the data and decides on a best share adjustment and reallocation action according to a method as shown, e.g., in TABLES IV and V. Share adjustment and VM migration requests are sent to the executor module 128 that translates them into management commands appropriate for a given virtualization system.

TABLE II

| Parameter | Description |
|---|---|
| ACT_SHARE | fraction of CPU capacity allocated to active VMs (e.g., 0.8) |
| SHARE_INT | time (in measurement intervals) between subsequent share reassignments (e.g., 12) |
| MIGR_INT | time (in measurement intervals) between subsequent migrations from a host (e.g., 60) |
| IDLE_CUT | probability threshold at which VM is declared idle (e.g., 0.7) |
| MIGR_THR | percentage difference in server utilization required for migration (e.g., 30) |
| $BV_i$ | business value of measurement element $i (\geq 1)$ |

TABLE III

| Estimated Variable | Description |
|---|---|
| $b_v^{active}$ | active period distribution parameter (as described in Section II) for VM v |
| $b_v^{idle}$ | idle period distribution parameter (as described in Section II) for VM v |
| $m_v^{idle}$ | mean resource usage when VM v is idle |
| $m_v^{active}$ | mean resource usage when VM v is active |
| $s_v^{active}$ | std of resource usage when VM v is active |
| $s_v^{idle}$ | std of resource usage when VM v is idle |
| $baseline_i$ | resp. time of measurement element i on idle system |

TABLE II describes main tuning parameters of the method shown in TABLES IV and V. TABLE III presents variables that are estimated from historical user and activity data.

TABLE IV includes pseudo-code for one step of the controller 128, and TABLE V includes pseudo-code of helper functions.

TABLE IV

```
Pseudo-code for a control step:
% single step of the VM controller
for each VM v do
    if currently_active(v) then {
        mark active(u)
        a = prob_active(u, MIGR_INT);
```
$L_v^{mean} = a * m_v^{active} + (1 + a) * m_v^{idle}$;
$L_v^{std} = a * s_v^{active} + (1 + a) * m_v^{idle}$;
```
        weight_v = business_value(v)
    } else {
        if prob_idle (v, SHARE_INT) > IDLE_CUT then
            mark_idle(v)
        a = prob_idle (v, MIGR_INT);
```
$L_v^{mean} = a * m_v^{idle} + (1 + a) * m_v^{active}$;
$L_v^{std} = a * s_v^{idle} + (1 + a) * s_v^{active}$;
```
    }
end for;
for each PM p do
    All_p = {set of all VMs on p};
    Active_p = {set of VMs p marked as active};
    for each VM v in Active_p do
```
$$w = \frac{weight_v}{\sum_{i \in Active_p} weight_i};$$

$$share_v = \frac{ACT\_SHARE}{2|Active_p|} + \frac{ACT\_SHARE}{2} * w;$$

```
    end for;
    for each VM v in All_p − Active_p do
```
$$share_v = \frac{1 - ACT\_SHARE}{|All_p - Active_p|};$$

```
    end for;
```
$$T_p = \sum_{v \in All_p} L_v^{mean} + \sqrt{\sum_{v \in All_p} (L_v^{std})^2};$$

```
end for;
for each eligible pair of PMs (p1, p2)
such that T_p1 − T_p2 MIGR_THR do
    shift_load (p1,p2)
end for;
```

Referring to TABLE 4, a step of the method is triggered every SHARE_INT measurement intervals. The method starts with classifying all VMs into active or idle based on probability estimate of the machine remaining in a current state throughout SHARE_INT future measurement intervals. The method also computes mean and standard deviation of expected load throughout an inter-migration interval (MIGR_INT). This is accomplished in a first "for" loop of the method. A second "for" loop examines all PMs (Physical Machines) and distributes shares based on activity and business value of virtual machine workloads. Finally, a third "for" loop searches for potential load shifting. Load is shifted only if discrepancy in expected loads (over the inter-migration time horizon MIGR_INT) is sufficient.

The method of TABLE IV is presented in a single resource version. Extension to a multi-resource version can be accomplished by adding computations of expected load for multiple resources and deciding upon migration based on multi-dimensional constraints.

TABLE V

Helper Functions for TABLE IV

```
bool function currently_active(v) {
    return true if VM session has keyboard or mouse events
    or sufficient screen updates
```

TABLE V-continued

Helper Functions for TABLE IV

```
    activity; false otherwise
}
float function prob_active (v, time_horizon) {
    x = number of intervals for which v was active;
```
$b_v^{active}$ = activity distribution parameter for v;

$$return \left(\frac{x}{time\_horizon + x}\right)^{b_v^{active}}$$

```
}
float function prob_idle (v, time_horizon) {
    x = number of intervals for which v was idle;
```
$b_v^{idle}$ = idleness distribution parameter for v;

$$return \left(\frac{x}{time\_horizon + x}\right)^{b_v^{idle}}$$

```
}
float function business_value (v) {
    if has_responsiveness_measurements (v) then
        K = number of measurements for VM v;
```
$$return \sum_{i=1}^{K} \frac{resp_i^v}{baseline_i} * BV_i;$$

```
    else
        return 1;
}
procedure shift_load (p1,p2) {
    find VMs on p1 that can be moved to p2 and migrate them.
    The move should be executed only if it reduces
    difference between expected loads; mark p1 as not eligible
    for migration until MIGR_INT;
}
```

Referring to TABLE V, illustrative helper functions are shown to be employed with the control method of TABLE V. A bool function returns true if a VM session has keyboard events, mouse events or sufficient screen updates activity. Otherwise, it returns false. There are three float functions for different states. These include prob_active, prob_idle and business_value. If the number of intervals is active, idle or if responsiveness measurements are encountered, probability distributions are computed and returned. A procedure is also included that shifts or migrates a load.

EMPIRICAL STUDIES: To evaluate the method of TABLE IV and to present its important features, we have implemented a prototype control system that works with VMWare VI3™. It is a Java™ program running within a virtual machine that is dedicated to management functions. In each measurement interval, the controller receives a set of measurements of VM and server utilization from physical servers (retrieved using the esxtop program that is available on ESX servers). Each virtual machine runs an identical instance of Windows XP®. Users may connect to the VMs using RDP. To automate the experiments, a desktop benchmarking tool which allows for automated replaying of keyboard and mouse events thus simulating desktop user sessions was employed. The controller also receives counts of keyboard and mouse events from the clients, which are used to estimate user interactiveness. All data samples are averaged over 10 second intervals.

The control system 122 of FIG. 3, referred to hereinafter as the controller 122, analyzes the data in time-steps of 60 seconds (6 measurement intervals) and computes required adjustments. There are two types of control actions: share adjustment and virtual machine migration. The controller 122 executes both of these using the VMware web services SDK. The SDK allows for easy integration of ESX server management with java based programs (such as controller 122).

Figure 4:
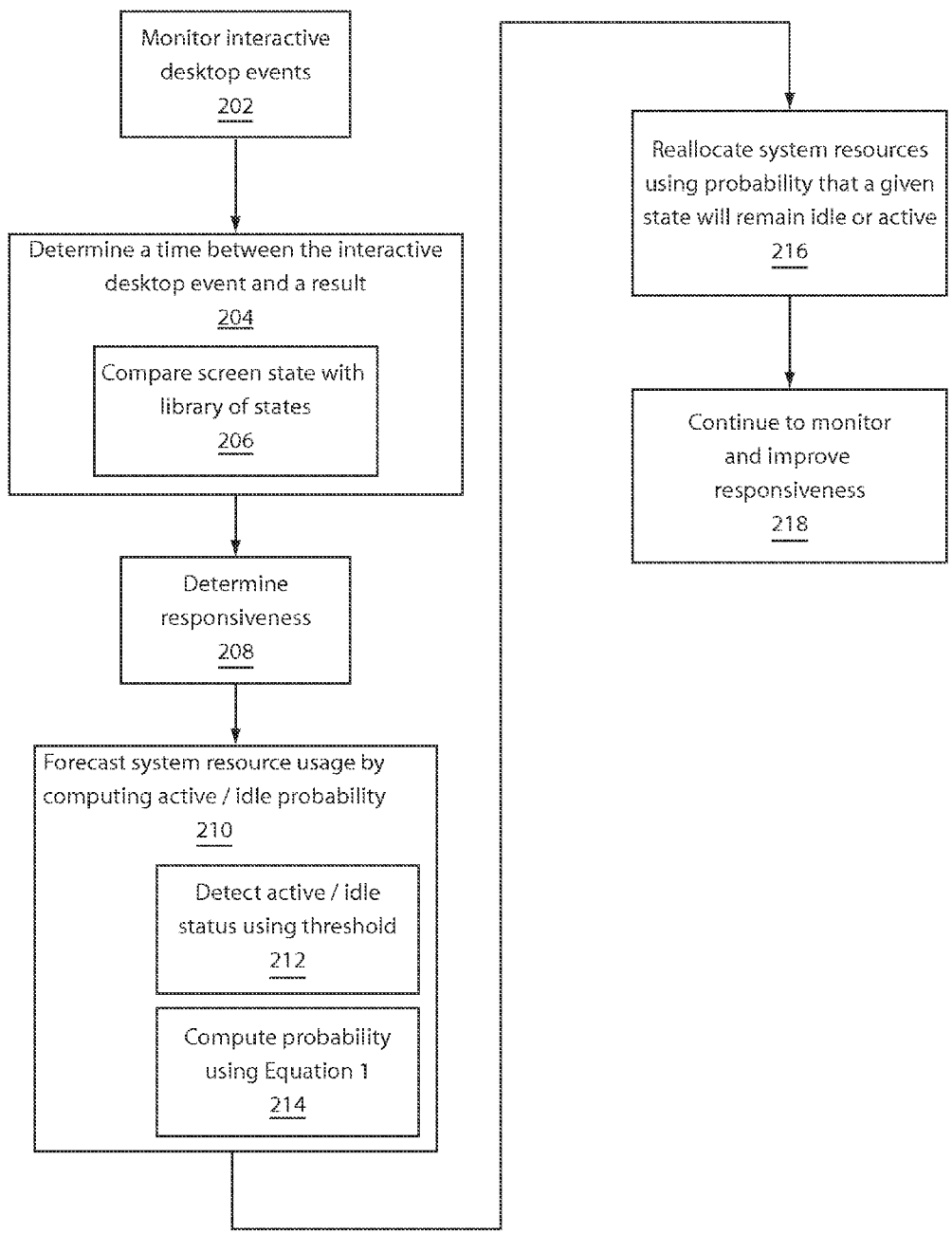
FIG. 4 is a block/flow diagram showing an illustrative system/method for reallocating resources to improve system responsiveness in accordance with one embodiment.

Referring to FIG. 4, a block/flow diagram is illustratively depicted showing a system/method for reallocating resources to improve system responsiveness in accordance with one embodiment. In block 202, interactive desktop events are monitored for a computer device. Interactive desktop events may include at least one of mouse events, keyboard events and pixel images on a display. Other events may include opening or closing an application, monitoring CPU usage (e.g., with a threshold to determine idle/active status), etc.

In block 204, a time between the interactive desktop event and a result of the interactive desktop event is measured. For example, the event may be a double-click on an icon and the result may be opening an application. The time provides a measure of responsiveness; however, other measurements of responsiveness may be employed. In block 206, measuring the time may include comparing a screen state or event with a library of events stored in memory and employing the screen state or event to determine a start time and an end time for the interactive desktop event. In block 208, based on the time, desktop responsiveness is determined. Responsiveness may consider many factors in addition to the measured time (e.g., the application being selected, the CPU usage, etc.).

In block 210, a probability that a virtual component will remain active or idle is determined as a way to forecast system resource usage. In this way, workload can be migrated in accordance with the probability to resources that are predictably idle. In block 212, the probability data is collected or determined by detecting idleness and active periods by setting a threshold for computer device usage and marking all periods below this threshold as idle and above the threshold as active or by monitoring keyboard events, mouse events and screen buffer update activities on a user device to determine the active/idle periods. In block 214, the probability is determined by computing $F(x)=1-a*x^{-b}$ (1) where b is a parameter depending on a workstation and a is a normalizing factor which enforces that F(x) is a probability distribution.

In block 216, system resources are reallocated to improve the responsiveness. The system resources are reallocated to improve the responsiveness using the probability that a given workstation is likely to remain idle or active knowing that it has been idle or active for time y (P(Residual lifetime>x|Age=y)) such that a distribution is matched by the Equation 1, and the probability can be evaluated as:

$$P(\text{Residual lifetime} > x | \text{Age} = y) = \left[\frac{y}{x+y}\right]^b \quad (2)$$

where b is a parameter depending on a workstation. Other methods such as the interactiveness of the user's virtual desktop (VM) may be employed as well to provide resource allocation.

In block 218, the responsiveness may be continued to be monitored to improve system performance.

Experiments were designed to test the methods as well as to illustrate the salient features of the present solution. For simplicity, we report only two of the testbed experiments: 1) illustrating share adjustment in response to activity and business importance of the desktop, and 2) illustrating load shifting between physical servers using virtual machine migration in response to load imbalance that is expected to persist sufficiently long.

Experiments were conducted using IBM HS2O Blades running ESX Server (version 3.0.2) and hosting desktop Virtual machines running Microsoft Windows XP®. These virtual machines represent desktop workstations running within a virtualized desktop environment. Blades are equipped with 1 Xeon CPU (3.2 GHZ multi-threaded). Controller virtual machine runs on one of the blades described above. RDP clients are running on another machine (IBM/Lenovo T60 laptop).

In the share adjustment experiment, we focus on evaluating the controller's actions in a situation when interactive and non-interactive VMs are co-hosted on a single server running at full capacity. This scenario can arise naturally in desktop environments when some users start non-interactive jobs, such as long term compilation, movie transcoding, or even CPU intensive screensavers, and other users perform interactive work, such as editing a document, browsing folders, or interacting with business applications.

For this experiment, we have 6 virtual machines constantly running a non-interactive load that consumes a significant amount of CPU. We also have 2 interactive virtual machines that are driven using RDP sessions from benchmarking clients. The interactive machines executed workloads consisted of opening Adobe® documents and browsing pictures using Windows® image viewer. The actions are randomly interleaved and also random think-times between subsequent actions are introduced to simulate a user's behavior.

Both actions performed by interactive users have associated measurement elements defined as set forth hereinabove. For Adobe® reader, it is the time between the double-click on the document icon and the time when the document is rendered on the client screen buffer. For the picture action, it is the time between double-clicking on the picture icon and the instant when the rectangular region in the lower part of the picture gets rendered on the client screen buffer. We assigned equal business values to both actions.

We report on two runs of this experiment, one with our controller disabled and one with the controller enabled. The time evolution of response time expansion factor (response time divided by the response time of the idle system) weighted by business value of action was collected. In the case of controller disabled, the expansion factors are high (up to 3 signifying the performance 3 times slower than on the idle system). When the controller in accordance with the present principles is enabled, the expansion factor is reduced to 1 due to share readjustment taking resources away from the non-interactive VMs. For the evolution of CPU usage, in the case of the controller being disabled, the utilization obtained by interactive VMs is small due to the batch load present. When the controller is enabled the interactive VMs get a much larger share of CPU which allows them to have better responsiveness. For the evolution of the probability estimate that a given VM will remain idle for the share adjustment interval, a metric is derived from workload profiles. The actual function used is Equation 2 with parameter b depending on virtual machine workload profile was employed. A horizontal line at probability 0.6 which is the value used as an IDLE_CUT value, i.e., to decide if the VM has a sufficiently large probability of remaining idle given its idleness "age".

In the migration experiment, we introduce a second physical server that resulted in load shift from the congested server. Initially interactive VMs start and have high (around 2) expansion factor. The system adjusts shares so that interactive VMs get cycles previously used by non-interactive ones. At 162 seconds, the system decided to migrate part of the load. During the migration, the interactive machines experience transient slowdown, but CPU capacity allocated to non-interactive VMs increased.

A novel system and method for passively monitoring desktop responsiveness based on a protocol and application independent keyboard and mouse events as well as the thin-client frame buffer state has been presented. An analysis of desktop user workload has been provided, revealing the functional form of idle and active time distributions that can be leveraged for efficient hosting of virtual desktops. An online management method is described which is customized for virtual machine based desktop hosting that utilizes passive responsive monitoring and user activity/idleness profiling. Experimental results of the testbed prototype that we have built demonstrate the effectiveness of the present system.

Having described preferred embodiments of a system and method for managing responsiveness of virtual desktops and efficient resource allocation (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for managing responsiveness of virtual desktops using passive monitoring, comprising:
measuring a time between an interactive desktop event and a result of the interactive desktop event, wherein measuring includes comparing a screen state or event with a library of events stored in memory and employing the screen state or event to determine a start time and an end time for the interactive desktop event; and
reallocating system resources to improve responsiveness time.

2. The method as recited in claim 1, wherein the interactive desktop event includes at least one of mouse events, keyboard events and pixel images on a display.

3. The method as recited in claim 1, wherein the result of the interactive desktop event includes a response to the interactive desktop event including at least a change in appearance of a screen icon.

4. The method as recited in claim 1, wherein measuring includes determining a probability that a virtual component will remain active or idle and migrating workload in accordance with the probability.

5. The method as recited in claim 4, wherein determining a probability includes detecting idleness and active periods by setting a threshold for computer device usage and marking all periods below this threshold as idle and above the threshold as active.

6. The method as recited in claim 4, wherein measuring includes monitoring keyboard events, mouse events and screen buffer update activities on a user device to determine active and idle periods.

7. The method as recited in claim 4, wherein determining a probability includes computing the probability by $F(x)=1-a^*x^{-b}$ (1) where b is a parameter depending on a workstation and a is a normalizing factor which enforces that $F(x)$ is a probability distribution.

8. The method as recited in claim 7, wherein reallocating system resources to improve responsiveness time includes determining a probability that a given workstation is likely to remain idle or active knowing that it has been idle or active for time y (P(Residual lifetime>x|Age=y)) such that a distribution is matched by the Equation 1, and the probability can be evaluated as:

$$P(\text{Residual lifetime} > x | \text{Age} = y) = \left[\frac{y}{x+y}\right]^b \quad (2)$$

where b is a parameter depending on a workstation.

9. A computer readable storage medium comprising a computer readable program for managing responsiveness of virtual desktops using passive monitoring, wherein the computer readable program when executed on a computer causes the computer to:
measure a time between an interactive desktop event and a result of the interactive desktop event, wherein the measuring a time includes comparing a screen state or event with a library of events stored in memory and employing the screen state or event to determine a start time and an end time for the interactive desktop event; and
reallocate system resources to improve responsiveness time.

10. A method for managing responsiveness of virtual desktops using passive monitoring, comprising:
measuring a time between an interactive desktop event and a result of the interactive desktop event and employing the time to determine a probability that a virtual component will remain active or idle, wherein the measuring a time includes comparing a screen state or event with a library of events stored in memory and employing the screen state or event to determine a start time and an end time for the interactive desktop event; and
based on the probability, migrating workload in accordance with the probability that resources will remain active or idle to improve responsiveness.

11. The method as recited in claim 10, wherein the probability is determined by detecting idleness and active periods by setting a threshold for computer device usage and marking all periods below this threshold as idle and above the threshold as active.

12. The method as recited in claim 11, wherein the probability is determined by computing $F(x)=1-a^*x^{-b}$ (1) where b is a parameter depending on a workstation and a is a normalizing factor which enforces that $F(x)$ is a probability distribution.

13. The method as recited in claim 12, wherein migrating workload to improve responsiveness includes determining a probability that a given workstation is likely to remain idle or active knowing that it has been idle or active for time y (P(Residual lifetime>x|Age=y)) such that a distribution is matched by the Equation 1, and the probability can be evaluated as:

$$P(\text{Residual lifetime} > x | \text{Age} = y) = \left[\frac{y}{x+y}\right]^b \quad (2)$$

where b is a parameter depending on a workstation.

14. A computer readable storage medium comprising a computer readable program, wherein the computer readable program when executed on a computer causes the computer to perform the steps as recited in claim 10.

15. A system for managing responsiveness of virtual desktops, comprising:
a control system configured to receive responsiveness feedback and to reallocate system resources in accordance with the feedback, the control system being implemented in a computer device with memory storage, and comprising:

an allocation controller configured to receive responsiveness measurements based upon information about interactive desktop events and to receive resource utilization measurements to determine how to allocate resources to improve responsiveness, and a library of events stored in memory wherein a display screen is monitored to determine and compare displayed information with the library to determine a start time and an end time for an interactive desktop event.

16. The system as recited in claim 15, wherein the allocation controller determines a probability that a virtual component will remain active or idle to determine an expected workload.

17. The system as recited in claim 16, wherein the probability includes detecting idleness and active periods by setting a threshold for computer device usage and marking all periods below this threshold as idle and above the threshold as active.

18. The system as recited in claim 16, wherein the probability is based upon timing of at least one of keyboard events, mouse events and screen buffer update activities on a user device to determine active and idle periods.

19. The system as recited in claim 16, wherein the probability includes $F(x)=1-a*x^{-b}$ (1) where b is a parameter depending on a workstation and a is a normalizing factor which enforces that $F(x)$ is a probability distribution.

20. The system as recited in claim 15, wherein the control system reallocates resources to improve the responsiveness by determining that a given workstation is likely to remain idle or active knowing that it has been idle or active for time y (P(Residual lifetime>x|Age=y)) such that a distribution is matched by the Equation 1, and the probability is evaluated as:

$$P(\text{Residual lifetime} > x | \text{Age} = y) = \left[\frac{y}{x+y}\right]^b \quad (2)$$

where b is a parameter depending on a workstation.

* * * * *